United States Patent
Castelnuovo et al.

(10) Patent No.: US 9,401,911 B2
(45) Date of Patent: Jul. 26, 2016

(54) ONE-TIME PASSWORD CERTIFICATE RENEWAL

(75) Inventors: Ghila Castelnuovo, Tel Aviv (IL); Ziv Ayalon, Tel-Aviv (IL); Anat Bar-Anan, Tel-Aviv (IL); Ben Bernstein, Tel-Aviv (IL); Philip Derbeko, Modiin (IL); Victor W. Heller, Sammamish, WA (US); Aleksandr Radutskiy, Redmond, WA (US); Uzi Tuvian, Holon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 13/025,003

(22) Filed: Feb. 10, 2011

(65) Prior Publication Data

US 2012/0210123 A1   Aug. 16, 2012

(51) Int. Cl.
  *H04L 29/06* (2006.01)
(52) U.S. Cl.
  CPC .................................. *H04L 63/0823* (2013.01)
(58) Field of Classification Search
  CPC ... H04L 63/0823; H04L 9/3263; H04L 9/321; H04L 9/3268
  USPC .......................... 713/156, 157, 158, 160, 150
  See application file for complete search history.

(56) References Cited

U.S. PATENT DOCUMENTS

| 7,337,315 | B2 | 2/2008 | Micali |
| 7,650,497 | B2 | 1/2010 | Thornton et al. |
| 2004/0107360 | A1* | 6/2004 | Herrmann et al. ............. 713/201 |
| 2009/0313468 | A1* | 12/2009 | Hazlewood et al. .......... 713/156 |
| 2010/0115267 | A1* | 5/2010 | Guo et al. ...................... 713/156 |
| 2011/0113240 | A1* | 5/2011 | Fu et al. ......................... 713/156 |
| 2011/0154027 | A1* | 6/2011 | Liu et al. ........................ 713/158 |

OTHER PUBLICATIONS

VeriSign Unified Authentication The Next Generation of Strong Authentication, Pub. Date: 2004, (18 pages).
GT 4.0 Security: Key Concepts, http://globus.org/toolkit/docs/4.0/security/key-index.html, Nov. 19, 2010 (Retrieved Date), (5 pages).
Del Valle Torres Gerardo et al., Overview of the Key Management in Ad Hoc Networks, Pub. Date: 2004, (6 pages).
Brian Komar et al., Certificate Revocation and Status Checking, Jan. 23, 2006, (51 pages).
Daniel Kouril et al., Multi-mechanism Single Sign-On in Grids (CESNET Technical Report), Nov. 19, 2010 (Retrieved Date), (12 pages).

* cited by examiner

*Primary Examiner* — Hua Fan
*Assistant Examiner* — Normin Abedin
(74) *Attorney, Agent, or Firm* — Aneesh Mehta; Sade Fashokun; Micky Minhas

(57) ABSTRACT

Embodiments are directed to providing a certificate extension to an authentication certificate, to validating an authentication certificate request and to implementing authentication certificates that include certificate extensions. In an embodiment, a computer system accesses an authentication certificate request that is to be sent to a validation server for validation and to a certificate authority for issuance of an authentication certificate. The computer system appends an extension to the authentication certificate request. The extension includes origination information about the authentication certificate. The computer system then sends the authentication certificate request with the appended extension to the validation server for validation.

20 Claims, 5 Drawing Sheets

ONE-TIME PASSWORD CERTIFICATE RENEWAL

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. In some cases, the software applications may establish secure connections between each other. For instance, the applications may establish an internet protocol security (IPSEC) connection to ensure secure communication. IPSEC may implement different protocols including Kerberos, certificate-based authentication and pre-shared key authentication.

Kerberos implementations typically use an authentication ticket which is renewable. The ticket may be automatically renewed for a limited time. In certificate-based implementations, the certificates are either not renewable or are renewed for an unlimited time.

BRIEF SUMMARY

Embodiments described herein are directed to providing a certificate extension to an authentication certificate, to validating an authentication certificate request and to implementing authentication certificates that include certificate extensions. In one embodiment, a computer system accesses an authentication certificate request that is to be sent to a validation server for validation and to a certificate authority for issuance of an authentication certificate. The computer system appends an extension to the authentication certificate request. The extension includes origination information about the authentication certificate. The computer system then sends the authentication certificate request with the appended extension to the validation server for validation.

In another embodiment, a validation server receives an authentication certificate renewal request from a client. The request includes an original certificate extension comprising first issuance data that includes a certificate issuance time. The computer system determines that the authentication certificate renewal request is valid and sends the authentication certificate renewal request to a certificate authority for issuance of a renewed certificate. The computer system receives a certificate issued by the certificate authority that includes the original certificate extension and sends the renewed certificate to the client.

In still another embodiment, a computer system generates an authentication certificate renewal request to renew a previously issued authentication certificate. The authentication certificate includes an extension that identifies when the certificate was originally issued. The computer system sends the generated renewal request to a validation server for validation and, upon validation, to a certificate authority for issuance of a renewed certificate. The computer system also receives a renewed authentication certificate from the validation server. The renewed authentication certificate includes the original extension identifying when the certificate was originally issued.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
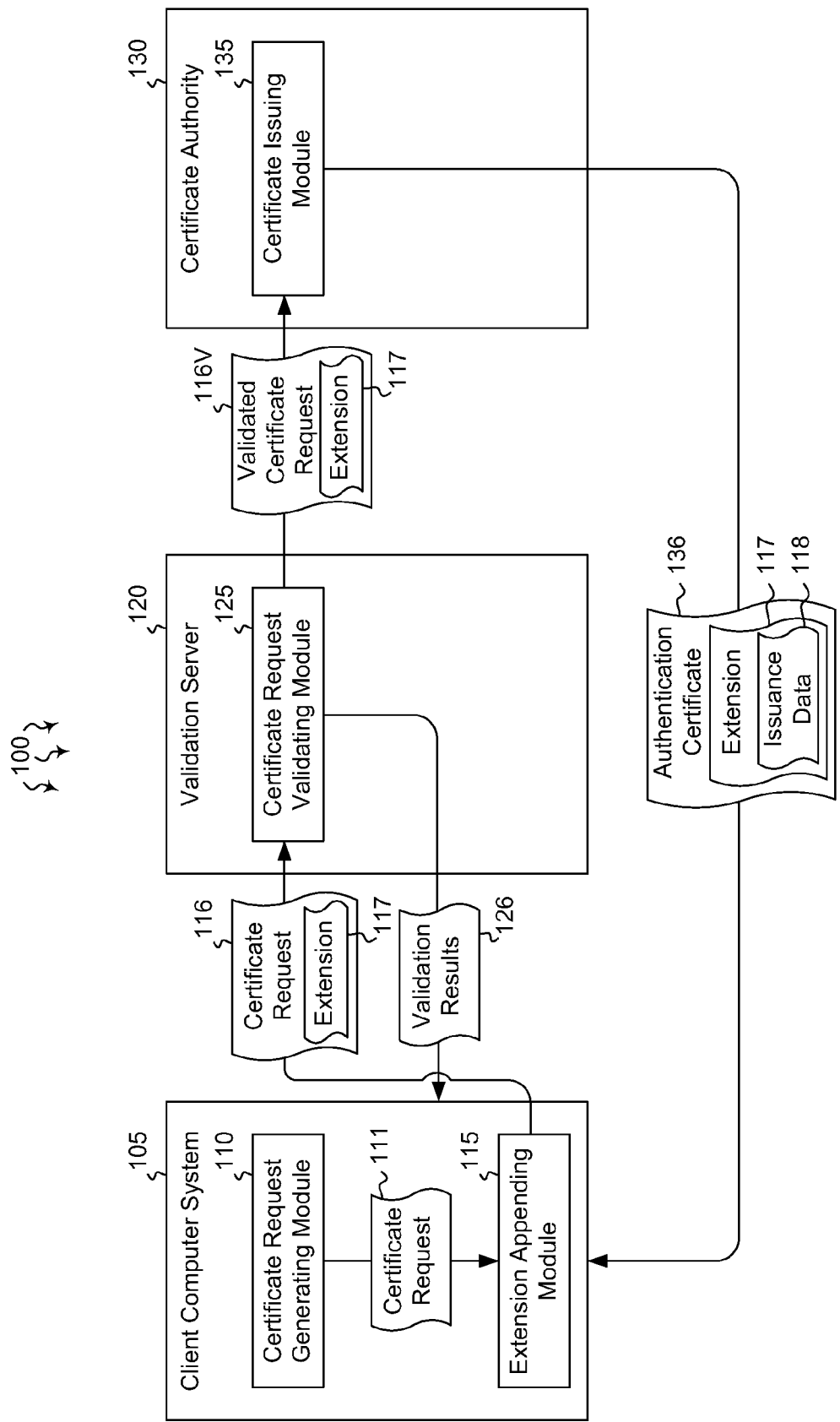
FIG. 1 illustrates a computer architecture in which embodiments of the present invention may operate including providing a certificate extension to an authentication certificate.

Embodiments described herein are directed to providing a certificate extension to an authentication certificate, to validating an authentication certificate request and to implementing authentication certificates that include certificate extensions. In one embodiment, a computer system accesses an authentication certificate request that is to be sent to a validation server for validation and to a certificate authority for issuance of an authentication certificate. The computer system appends an extension to the authentication certificate request. The extension includes origination information about the authentication certificate. The computer system then sends the authentication certificate request with the appended extension to the validation server for validation.

In another embodiment, a validation server receives an authentication certificate renewal request from a client. The request includes an original certificate extension comprising first issuance data that includes a certificate issuance time. The computer system determines that the authentication certificate renewal request is valid and sends the authentication certificate renewal request to a certificate authority for issuance of a renewed certificate. The computer system receives a certificate issued by the certificate authority that includes the original certificate extension and sends the renewed certificate to the client.

In still another embodiment, a computer system generates an authentication certificate renewal request to renew a previously issued authentication certificate. The authentication certificate includes an extension that identifies when the certificate was originally issued. The computer system sends the generated renewal request to a validation server for validation and, upon validation, to a certificate authority for issuance of a renewed certificate. The computer system also receives a renewed authentication certificate from the validation server. The renewed authentication certificate includes the original extension identifying when the certificate was originally issued.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes client computer system 105, validation server 120 and certificate authority 130. Each of these may be any type of local or distributed computer system. The client computer system includes a certificate request generating module 110. The certificate request generating module (or module 110 herein) may be configured to generate a certificate request 111. The certificate request may be issued by a client computer system that desires to securely connect to another computer system. The requested certificate may be any type of digital certificate used to verity a user's identity. The extension appending module 115 of the client computer system may append an extension to the request. This extension 117 may allow the certificate authority to issue a limited-time certificate to the client. The time for which the certificate is valid may be customizable by an administrator.

The validation server 120 may be a proxy server that is configured to validate the certificate request 116 sent from the client computer system. The validation results 126 may be sent to back to the client computer system after the validation is complete. The validated certificate request 116V, along with the certificate extension 117 may be sent to certificate authority 130. The certificate issuing module 135 of the certificate authority may issue an authentication certificate 136 to the client computer system. The authentication certificate may allow the client computer system to securely communicate with another computer system. The secure connection would be established for a certain period of time. This time may be indicated in the issuance data 118 included in the certificate extension 117. In this manner, a certificate authority that would, at least for some certificates, be limited to issuing unlimited-time certificates, can issue limited-time certificates. This will be explained in greater detail below with regard to methods 200, 300 and 400 of FIGS. 2, 3 and 4, respectively.

Figure 2:
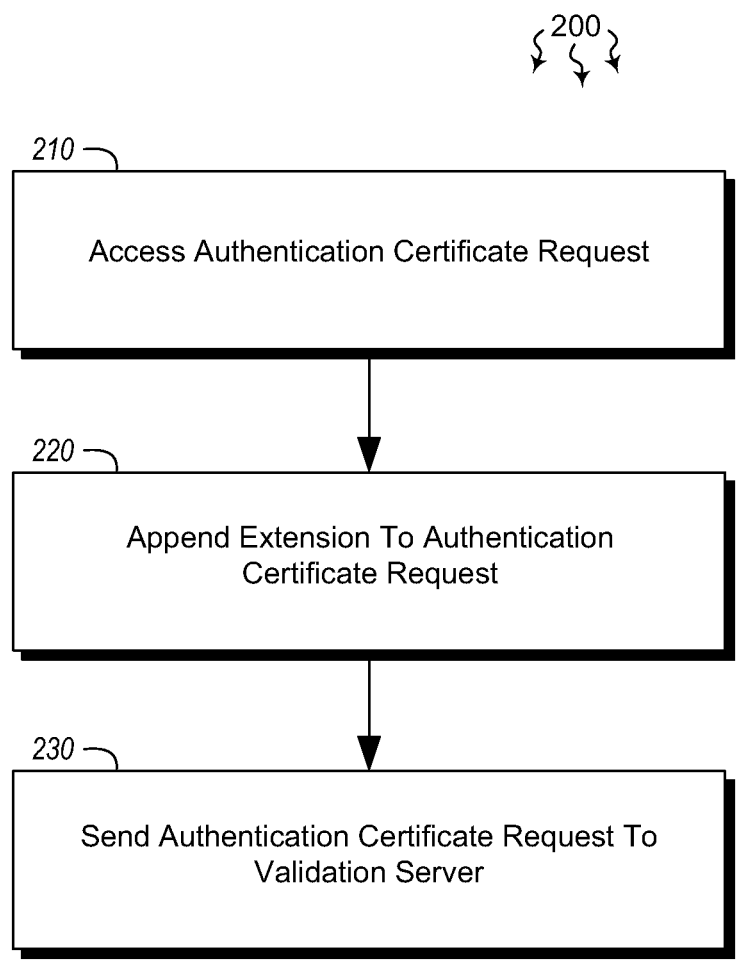
FIG. 2 illustrates a flowchart of an example method for providing a certificate extension to an authentication certificate.
Figure 3:
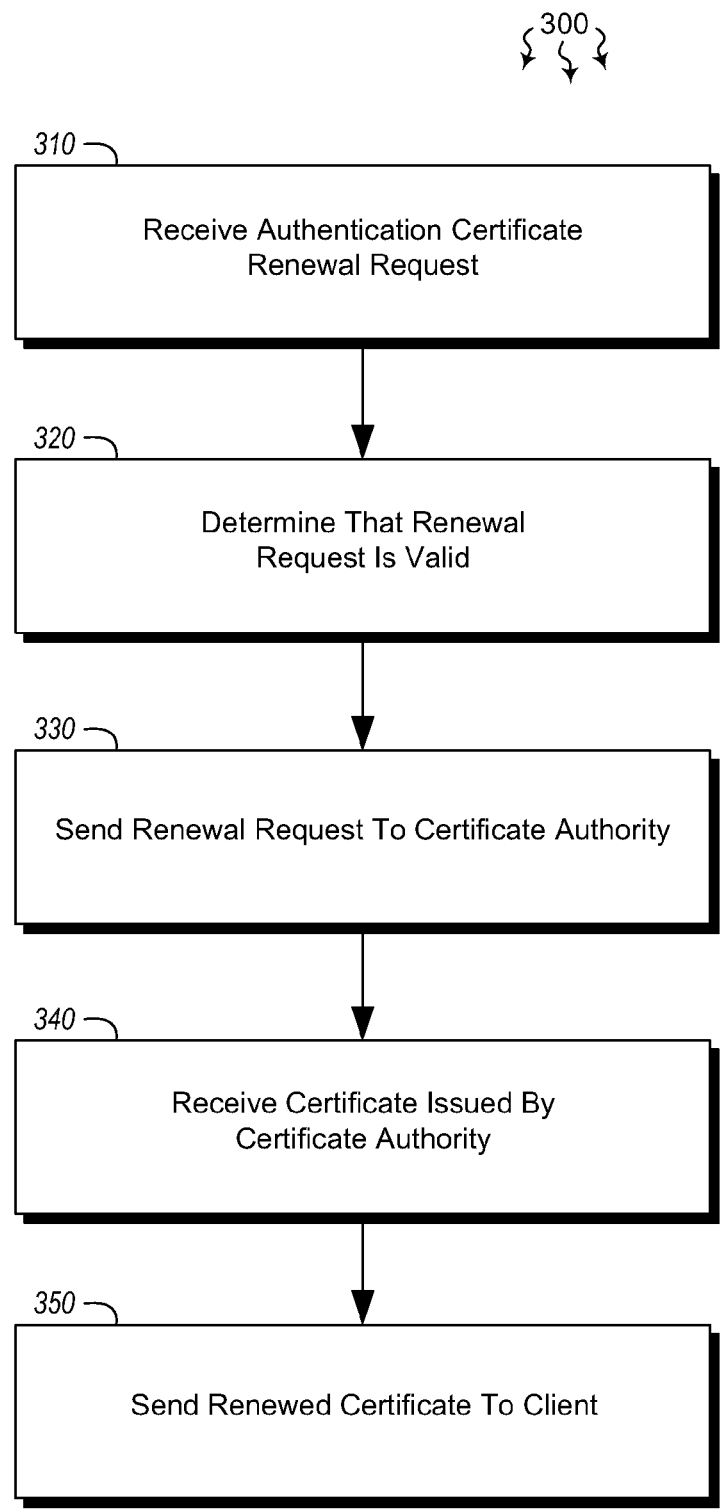
FIG. 3 illustrates a flowchart of an example method for validating an authentication certificate request.
Figure 4:
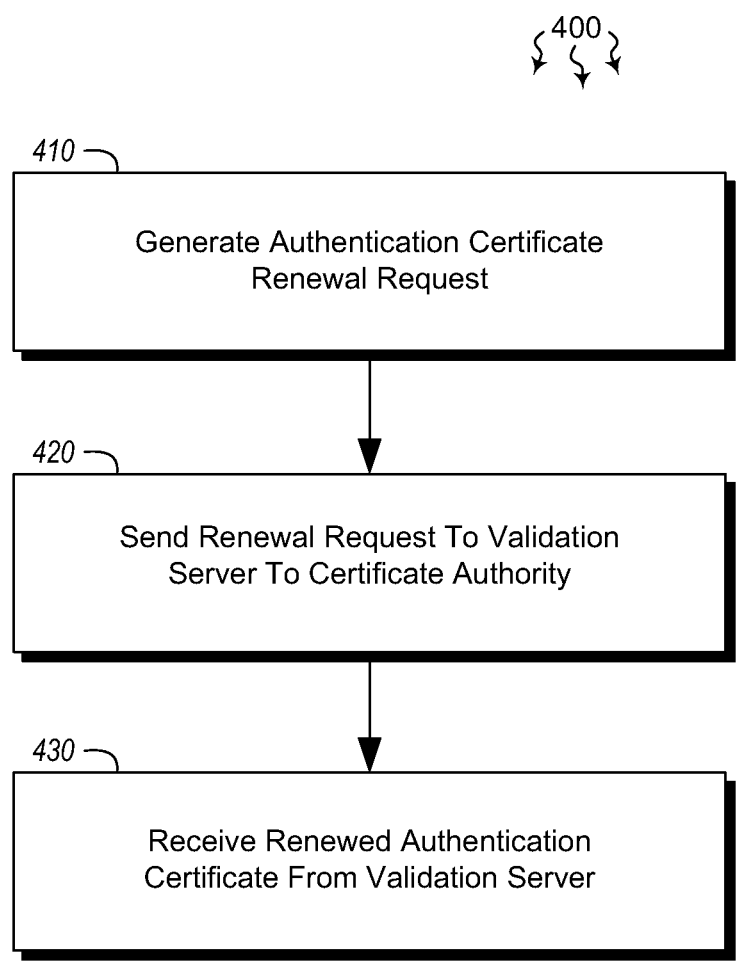
FIG. 4 illustrates a flowchart of an example method for implementing authentication certificates that include certificate extensions.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing a certificate extension to an authentication certificate. The method 200 will now be described with frequent reference to the components and data of environment 100.

Method 200 includes an act of accessing an authentication certificate request that is to be sent to a validation server for validation and to a certificate authority for issuance of an authentication certificate (act 210). For example, client computer system 105 may generate and/or access a previously generated certificate request 111. The certificate request is to be sent to validation server 120 for validation and, upon validation, to certificate authority 130. The certificate authority will then issue an authentication certificate 136 for the client computer system.

In some embodiments, the authentication certificate request 111 includes a client's one-time password. The one-time password may be any type of text or other user-provided input sequence that is known to the user, and which grants the user (or the user's computer system) access to another remote or local computer system with which the user wants to securely communicate. In some cases, the one-time password is valid only for a single individual. In other cases, the one-time password may apply to a group of users, each of which can use the password.

Method 200 includes an act of appending an extension to the authentication certificate request, wherein the extension includes origination information about the authentication certificate (act 220). For example, extension appending module 115 may append extension 117 to authentication certificate request 116. The extension may include origination information about the authentication certificate such as an indication of when the certificate was issued for the first time, which user and/or computer system issued the request, when the last request from the user was received, and other pertinent information. Once the certificate is ultimately issued, any subsequent renewals of the certificate may include the origination information in the extension.

The validation server 120, upon receiving the certificate request 116 from the client computer system, may access the origination or first issuance data stored in the extension 117 to determine whether the issued certificate has expired. If the validation server determines that the certificate has expired or is otherwise invalid, the validation server will deny the request for renewal. If the validation server determines that the certificate has not expired, the validation server will validate the request and send the results of the validation 126 back to the client computer system. The validation server will also send the validated certificate request 116V to the certificate authority for renewal while maintaining the first issuance data. The first issuance data may be maintained permanently in the certificate extension.

Method 200 includes an act of sending the authentication certificate request with the appended extension to the validation server for validation (act 230). For example, client computer system 115, after generating the certificate request 111 and appending the first issuance data in the extension 117 of the certificate request, can send the certificate request with appended extension to the validation server for validation.

As mentioned above, in response to the client computer system's generated certificate request, the client may receive a limited-time certificate 136 from the certificate authority 130. The limited-time certificate may grant the user access to a data, web or other server for a certain period of time. The limited-time authentication certificate includes the extension 117 along with the first issuance data 118. Once the time period has expired, the certificate will no longer be valid and would need to be renewed. During the time period, the user may use the certificate to access data on servers that requires certificate-based authentication.

FIG. 3 illustrates a flowchart of a method 300 for validating an authentication certificate request. The method 300 will now be described with frequent reference to the components and data of environment 100.

Method 300 includes an act of validation server receiving an authentication certificate renewal request from a client, wherein the request includes an original certificate extension comprising first issuance data that includes a certificate issuance time (act 310). For example, validation server 120 may receive authentication certificate renewal request 116 from client computer system 105. The certificate request may include certificate extension 117 which includes first issuance data. The first issuance data may include various portions of information about the creation of the initial certificate including the date and time the certificate was first issued.

Method 300 includes an act of determining that the authentication certificate renewal request is valid (act 320). For example, validation server 120 may determine that the received authentication certificate request is valid. In this determination, the validation server may identify the time the certificate was first issued from the first issuance data in the extension. The validation server may then compare the first issuance data (or last issuance data which would indicate the last time the certificate was successfully renewed) to the current time. If the difference between the current time and the first (or last) issuance time is too great (i.e. greater than the specified time period for which the certificate is valid), then the certificate request will be invalidated, and the results 126 will be sent back to the client system. On the other hand, if the difference between the current time and the first (or last) issuance time is within the specified time period for which the certificate is valid, then the certificate request will be validated, the results will be sent back to the client system, and the validated request 116V will be sent on to the certificate authority for renewal or initial issuance.

In some cases, the time that the certificate is allowed to be renewed may be customizable. A computer administrator that has sufficient rights to the validation server may specify the time period during which a given certificate is valid. Accordingly, the administrator may specify a time over which a certificate will be invalid, and under which the certificate will remain valid. In some cases, the administrator may specify other invalidating criteria that, if present, also invalidate the certificate. The customizable specified time may, at least in some cases, be equal to the addition of the first issuance time and the maximum allowed renewal time. The server administrator may also be able to determine how many times a certificate may be renewed renewable. Each of these settings may be changed and configured to apply to a single user, to a group of users, or to another type of entity. In some cases, the validity of the extension 117 may be verified upon the first certificate request that the client sends (e.g. certificate request 116). When the client adds the extension, the validation server verifies that the extension is a valid one before sending the request to the certificate authority 130.

Method 300 includes an act of sending the validated authentication certificate renewal request to a certificate authority for issuance of a renewed certificate (act 330). For example, validation server 120 may send validated authentication certificate request 116V to certificate authority 130. The certificate authority may issue a new certificate (or renew an existing certificate) using module 135. The certificate authority may also copy the first issuance data included in the extension of request and sends that data back in the renewed certificate (i.e. data 118 in extension 117 of authentication certificate 136.

Method 300 includes an act of receiving a certificate issued by the certificate authority, wherein the certificate includes the original certificate extension (act 340). For example, validation server 120 may receive authentication certificate 136 which was issued by the certificate authority. The issued certificate includes the first issuance data originally appended to the certificate request by the client computer system. The validation server may send the renewed certificate back to the client (act 350). In this manner, a validation server may act as a proxy to validate incoming certificate renewal/issuance requests and allow those requests that are valid to be sent to the certificate authority, while those requests that are invalid are returned to the client as being improper.

Figure 5:
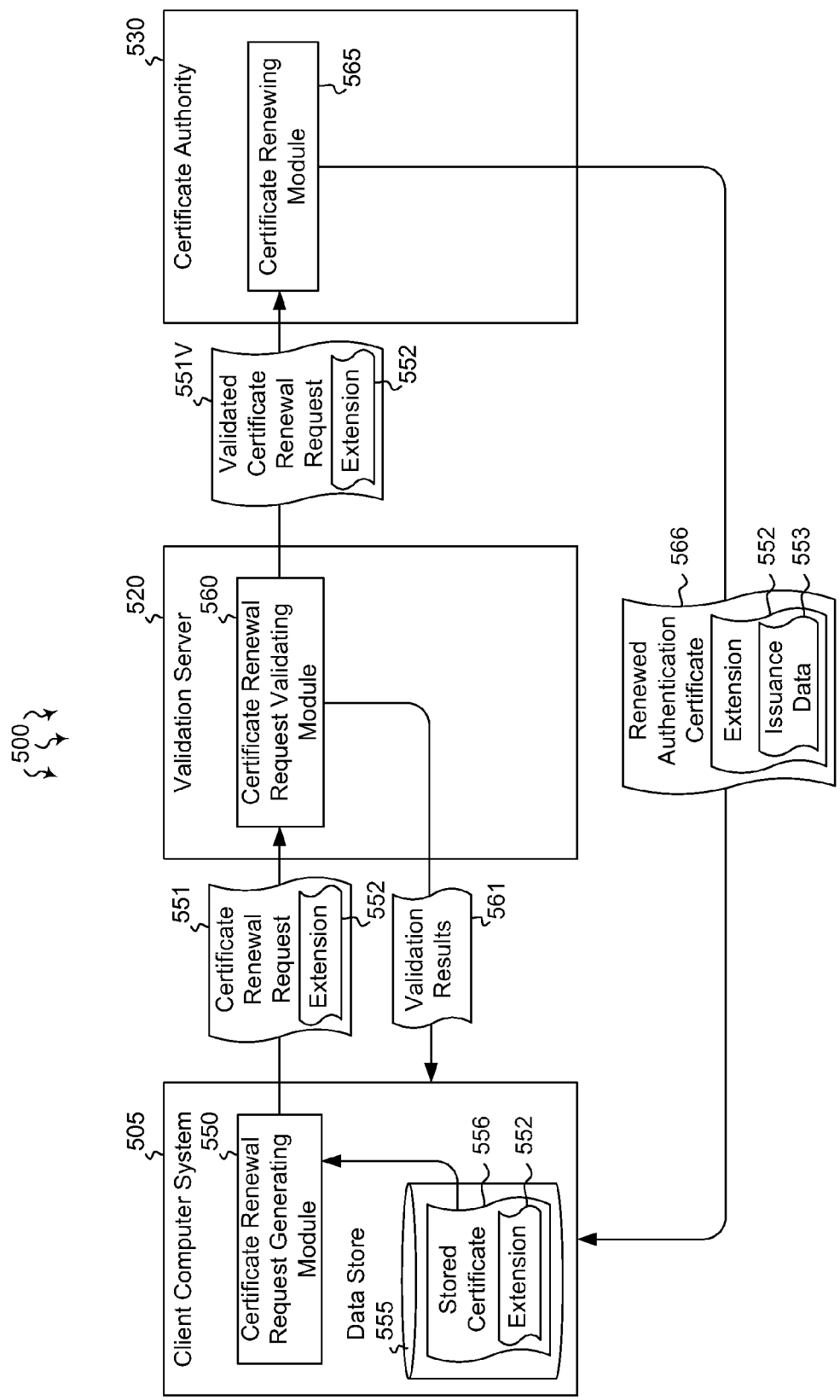
FIG. 5 illustrates a computer architecture in which authentication certificates that include certificate extensions may be implemented.

FIG. 4 illustrates a flowchart of a method 400 for implementing authentication certificates that include certificate extensions. The method 400 will now be described with frequent reference to the components and data of environment 500 of FIG. 5.

Method 400 includes an act of generating an authentication certificate renewal request to renew a previously issued authentication certificate, wherein the authentication certificate includes an extension that identifies when the certificate was originally issued (act 410). For example, certificate renewal request generating module 550 of client computer system 505 may generate certificate renewal request 551. The renewal request includes extension 552 which includes first issuance data.

The first issuance data includes an indication of when the certificate was originally issued. The originally issued certificate 556 may be stored in data store 555 of the client computer system. The authentication certificate renewal request may include a client's one-time password, along with the other information stored in the appended extension.

Method 400 includes an act of sending the generated renewal request to a validation server for validation and, upon validation, to a certificate authority for issuance of a renewed certificate (act 420). For example, client computer system 505 may send certificate renewal request 551 to validation server 520 for validation. After determining that the certificate renewal request is valid, the validated request 551V is sent to the certificate authority 530. The validation server also sends back the results of the validation 561 to the client. In cases where the validation server determines that the certificate renewal request is invalid, the results of the validation may similarly be sent back to the client indicating the request's invalidity. In some embodiments, the validation server (or an administrator thereof) may be able to determine how many times a certificate may be renewed.

Method 400 includes an act of receiving a renewed authentication certificate from the validation server, wherein the renewed authentication certificate includes the original extension identifying when the certificate was originally issued (act 430). For example, client computer system 505 may receive renewed authentication certificate 566 from certificate authority 530. The certificate renewing module 565 of the certificate authority may issue the renewed certificate upon receiving the validated certificate renewal request, which includes the client's one-time password and the first issuance data 553. The certificate authority may renew the certificate for a customizable amount of time. During that time, the user can use the issued renewed certificate to access data on a data server that requires certificate-based authentication.

In some cases, when a client sends a renewal request 551 with an extension 552 that includes the original certificate issuance date, the validation server may require the user (or client computer system) to provide proof that the date written in the extension is authentic. In some embodiments, the user may provide this proof by sending a previous certificate. By sending the previously generated certificate, the validation server 520 may be able to confidently trust the date of original certificate issuance.

Thus, methods, systems and computer program products are provided which provide certificate extensions to authentication certificates. The extensions allow first issuance data to be stored and sent with the certificate. Methods, systems and computer program products are further provided which validate authentication certificate requests and implement authentication certificates that include certificate extensions. In this manner, certificates may be renewed or issued for a customizable, limited time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a client computer system including at least one processor and a memory, in a computer networking environment including a plurality of computing systems, a computer-implemented method for providing a certificate extension to an authentication certificate, the method comprising:

accessing an authentication certificate renewal request that is to be sent first to a validation server for validation and, when validated by the validation server, to a certificate authority for issuance of an authentication certificate;

appending an extension to the authentication certificate renewal request, the extension including origination information about the authentication certificate, identification of a user and computer system which issued the request, and indication of when a last request from the user was received, and wherein the extension is sent with the authentication certificate renewal request to the validation server for validation;

sending the authentication certificate renewal request with the appended extension to the validation server for validation, wherein when validated by the validation server, the validation server sends the validated request and the extension to the certificate authority for issuance of an authentication certificate; and receiving a validation result from the validation server.

2. The method of claim 1, wherein the authentication certificate request includes a client's one-time password.

3. The method of claim 2, further comprising receiving a limited-time certificate from the certificate authority.

4. The method of claim 3, further comprising using the received limited-time certificate to access data on a data server that requires certificate-based authentication.

5. The method of claim 3, wherein the received limited-time certificate includes the certificate extension with the origination data.

6. The method of claim 1, wherein the origination data includes information indicating when the certificate was issued for the first time.

7. The method of claim 6, wherein each subsequent renewal includes the certificate extension with the first issuance data.

8. The method of claim 6, wherein the validation server performs the following:
  accesses the first issuance data to determine whether the issued certificate has expired; and
  upon determining that the certificate has expired, denying the request for renewal.

9. The method of claim 6, wherein the validation server performs the following:
  accesses the first issuance data to determine whether the issued certificate has expired; and
  upon determining that the certificate has not expired, sends the received certificate request to the certificate authority for renewal while maintaining the first issuance data.

10. A computer program product for implementing a method for validating an authentication certificate request, the computer program product comprising one or more computer-readable storage memory having stored thereon computer-executable instructions that, when executed by one or more processors of the computing system, cause the computing system to perform the method, the method comprising:
  a validation server receiving an authentication certificate renewal request from a client, the request including an original certificate extension comprising first issuance data that includes a certificate issuance time, identification of a user and computer system which issued the request, and indication of when a last request from the user was received, and wherein the original certificate extension had been appended to the authentication certificate renewal request by the client;
  the validation server determining whether the authentication certificate renewal request is valid;
  the validation server sending a validation result to the client; and
  upon being validated the validation server sending the validated authentication certificate renewal request and the extension to a certificate authority for issuance of a renewed certificate;
  the validation server receiving a certificate issued by the certificate authority, wherein the certificate includes the original certificate extension; and
  the validation server sending the renewed certificate to the client.

11. The computer program product of claim 10, wherein determining validity comprises checking the time that the certificate is allowed to be renewed.

12. The computer program product of claim 11, wherein the time that the certificate is allowed to be renewed is customizable.

13. The computer program product of claim 11, wherein the time that the certificate is allowed to be renewed is the result of the addition of a first issuance time and a maximum allowed renewal time.

14. The computer program product of claim 10, wherein the certificate authority copies the data included in the request and sends that data back in the renewed certificate.

15. The computer program product of claim 10, wherein a validation server administrator determines how many times a certificate is renewable.

16. A computer system comprising the following:
  one or more processors;
  system memory;
  one or more computer-readable storage media having stored thereon computer-executable instructions that, when executed by the one or more processors, causes the computing system to perform a method for implementing authentication certificates that include certificate extensions, the method comprising the following:
    generating an authentication certificate renewal request to renew a previously issued authentication certificate, the renewal request to be sent first to a validation server for validation and, upon validation by the validation server, to a certificate authority for issuance of an authentication certificate;
    appending to the authentication certificate renewal request an extension that identifies when the certificate was originally issued, identification of a user and computer system which issued the request, and indication of when a last request from the user was received;
    sending the generated renewal request and the appended extension to a validation server for validation, wherein upon validation by the validation server, the validation server sends the validated renewal request and the extension to a certificate authority for issuance of a renewed certificate;
    receiving a validation result from the validation server; and
    when the generated renewal request and the appended extension have been validated by the validation server, receiving a renewed authentication certificate from the validation server, wherein the renewed authentication certificate was generated by the certificate authority and includes the original extension identifying when the certificate was originally issued.

17. The computer system of claim 16, wherein the authentication certificate renewal request includes a client's one-time password.

18. The computer system of claim 17, wherein the renewed authentication certificate is renewed for a customizably limited time.

19. The computer system of claim 16, further comprising using the received limited-time certificate to access data on a data server that requires certificate-based authentication.

20. The computer system of claim 16, wherein the validation server determines how many times a certificate is renewable.

* * * * *